United States Patent
Richardson

(10) Patent No.: US 8,160,962 B2
(45) Date of Patent: Apr. 17, 2012

(54) INSTALLING PROTECTED SOFTWARE PRODUCT USING UNPROTECTED INSTALLATION IMAGE

(75) Inventor: Ric B. Richardson, Irvine, CA (US)

(73) Assignee: Uniloc Luxembourg S.A., Luxembourg (LU)

(*) Notice: Subject to any disclaimer, the term of this patent is extended or adjusted under 35 U.S.C. 154(b) by 867 days.

(21) Appl. No.: 12/235,243

(22) Filed: Sep. 22, 2008

(65) Prior Publication Data

US 2009/0083730 A1 Mar. 26, 2009

Related U.S. Application Data

(60) Provisional application No. 60/973,781, filed on Sep. 20, 2007.

(51) Int. Cl.
 G06F 21/00 (2006.01)
 G06F 11/30 (2006.01)
 G06F 9/445 (2006.01)
(52) U.S. Cl. ............................ 705/51; 713/189; 717/174
(58) Field of Classification Search .................... 705/51; 713/189; 717/174
 See application file for complete search history.

(56) References Cited

U.S. PATENT DOCUMENTS

| | | | |
|---|---|---|---|
| 4,351,982 A | 9/1982 | Miller et al. | |
| 4,658,093 A | 4/1987 | Hellman | |
| 4,704,610 A | 11/1987 | Smith et al. | |
| 4,796,220 A | 1/1989 | Wolfe | |
| 4,864,494 A * | 9/1989 | Kobus, Jr. | 726/33 |
| 4,999,806 A * | 3/1991 | Chernow et al. | 717/177 |
| 5,210,795 A | 5/1993 | Lipner et al. | |
| 5,260,999 A | 11/1993 | Wyman | |
| 5,291,598 A | 3/1994 | Grundy | |
| 5,414,269 A | 5/1995 | Takahashi | |
| 5,418,854 A | 5/1995 | Kaufman et al. | |
| 5,440,635 A | 8/1995 | Bellovin et al. | |
| 5,490,216 A | 2/1996 | Richardson, III | |
| 5,509,070 A | 4/1996 | Schull | |
| 5,638,513 A * | 6/1997 | Ananda | 726/5 |
| 5,666,415 A | 9/1997 | Kaufman | |
| 5,745,879 A | 4/1998 | Wyman | |
| 575,476 A | 5/1998 | Bereiter | |
| 5,754,763 A | 5/1998 | Bereiter | |
| 5,790,664 A * | 8/1998 | Coley et al. | 709/203 |

(Continued)

FOREIGN PATENT DOCUMENTS

AU 678985 6/1997

(Continued)

OTHER PUBLICATIONS

How Computers Work, 7th Edition. White, Ron. Que Publishing, Indianapolis, 2004. Entire work cited.*

(Continued)

*Primary Examiner* — James A Reagan
*Assistant Examiner* — Calvin Cheung
(74) *Attorney, Agent, or Firm* — Sean D. Burdick

(57) ABSTRACT

An installation image for installing an unprotected software product is used to install a protected version of the same product. A protected version of the executable file is embedded in a new installation image with the original installation image, in which the unprotected version of the executable file is damaged so as to be unusable and unreadable. The new installation image causes the original installation image to operate, installing the damaged installation file and other data files. The new installation image then replaces the damaged installation file with the protected installation file.

16 Claims, 4 Drawing Sheets

U.S. PATENT DOCUMENTS

| | | | |
|---|---|---|---|
| 5,925,127 A | 7/1999 | Ahmad | |
| 5,974,150 A | 10/1999 | Kaish et al. | |
| 6,009,401 A * | 12/1999 | Horstmann | 705/317 |
| 6,009,525 A * | 12/1999 | Horstmann | 726/22 |
| 6,029,141 A | 2/2000 | Bezos et al. | |
| 6,044,471 A | 3/2000 | Colvin | |
| 6,158,005 A | 12/2000 | Bharathan et al. | |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,243,469 B1 | 6/2001 | Kataoka et al. | |
| 6,294,793 B1 | 9/2001 | Brunfeld et al. | |
| 6,330,670 B1 | 12/2001 | England et al. | |
| 6,449,645 B1 | 9/2002 | Nash | |
| 6,484,182 B1 * | 11/2002 | Dunphy et al. | 700/231 |
| 6,536,005 B1 | 3/2003 | Augarten | |
| 6,587,842 B1 | 7/2003 | Watts | |
| 6,785,825 B2 | 8/2004 | Colvin | |
| 6,804,257 B1 | 10/2004 | Benayoun et al. | |
| 6,859,793 B1 | 2/2005 | Lambiase | |
| 6,920,567 B1 | 7/2005 | Doherty et al. | |
| 6,961,858 B2 * | 11/2005 | Fransdonk | 726/29 |
| 6,976,009 B2 | 12/2005 | Tadayon et al. | |
| 7,020,635 B2 * | 3/2006 | Hamilton et al. | 705/51 |
| 7,032,110 B1 | 4/2006 | Su et al. | |
| 7,051,211 B1 | 5/2006 | Matyas, Jr. et al. | |
| 7,069,440 B2 | 6/2006 | Aull | |
| 7,069,595 B2 | 6/2006 | Cognigni et al. | |
| 7,080,049 B2 * | 7/2006 | Truitt et al. | 705/75 |
| 7,085,741 B2 | 8/2006 | Lao et al. | |
| 7,090,128 B2 * | 8/2006 | Farley et al. | 235/384 |
| 7,107,462 B2 * | 9/2006 | Fransdonk | 713/193 |
| 7,150,045 B2 * | 12/2006 | Koelle et al. | 726/26 |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,272,728 B2 | 9/2007 | Pierson et al. | |
| 7,287,166 B1 * | 10/2007 | Chang et al. | 713/187 |
| 7,319,987 B1 | 1/2008 | Hoffman et al. | |
| 7,327,280 B2 | 2/2008 | Bachelder et al. | |
| 7,328,453 B2 * | 2/2008 | Merkle et al. | 726/23 |
| 7,337,147 B2 | 2/2008 | Chen et al. | |
| 7,343,297 B2 | 3/2008 | Bergler et al. | |
| 7,457,951 B1 | 11/2008 | Proudler et al. | |
| 7,463,945 B2 | 12/2008 | Kiesel et al. | |
| 7,653,899 B1 | 1/2010 | Lindahl et al. | |
| 2001/0034712 A1 | 10/2001 | Colvin | |
| 2001/0034846 A1 * | 10/2001 | Beery | 713/201 |
| 2001/0044782 A1 | 11/2001 | Hughes et al. | |
| 2002/0019814 A1 | 2/2002 | Ganesan | |
| 2002/0082997 A1 | 6/2002 | Kobata et al. | |
| 2002/0161718 A1 | 10/2002 | Coley et al. | |
| 2003/0065918 A1 | 4/2003 | Willey | |
| 2003/0172035 A1 | 9/2003 | Cronce et al. | |
| 2003/0191938 A1 * | 10/2003 | Woods et al. | 713/165 |
| 2004/0024860 A1 | 2/2004 | Sato et al. | |
| 2004/0030912 A1 | 2/2004 | Merkle, Jr. et al. | |
| 2004/0059929 A1 | 3/2004 | Rodgers et al. | |
| 2004/0059938 A1 | 3/2004 | Hughes et al. | |
| 2004/0066417 A1 | 4/2004 | Anabuki et al. | |
| 2004/0083469 A1 * | 4/2004 | Chen et al. | 717/168 |
| 2004/0143746 A1 | 7/2004 | Ligeti et al. | |
| 2004/0187018 A1 | 9/2004 | Owen et al. | |
| 2005/0108173 A1 | 5/2005 | Stefik et al. | |
| 2005/0138155 A1 | 6/2005 | Lewis | |
| 2005/0172280 A1 | 8/2005 | Ziegler et al. | |
| 2006/0026442 A1 | 2/2006 | Ittogi | |
| 2006/0072444 A1 | 4/2006 | Engel et al. | |
| 2006/0095454 A1 | 5/2006 | Shankar et al. | |
| 2006/0161914 A1 | 7/2006 | Morrison et al. | |
| 2006/0265337 A1 | 11/2006 | Wesinger, Jr. | |
| 2006/0265758 A1 | 11/2006 | Khandelwai et al. | |
| 2006/0282511 A1 | 12/2006 | Takano et al. | |
| 2007/0168288 A1 | 7/2007 | Bozeman | |
| 2007/0198422 A1 | 8/2007 | Prahlad et al. | |
| 2007/0203846 A1 | 8/2007 | Kavuri et al. | |
| 2007/0219917 A1 | 9/2007 | Liu et al. | |
| 2007/0220500 A1 | 9/2007 | Saunier | |
| 2007/0255947 A1 | 11/2007 | Choudhury et al. | |
| 2007/0282615 A1 | 12/2007 | Hamilton et al. | |
| 2007/0300308 A1 * | 12/2007 | Mishura | 726/27 |
| 2008/0065552 A1 | 3/2008 | Elazar et al. | |
| 2008/0086423 A1 | 4/2008 | Waites | |
| 2008/0147556 A1 | 6/2008 | Smith et al. | |
| 2008/0228578 A1 | 9/2008 | Mashinsky | |
| 2008/0320607 A1 | 12/2008 | Richardson | |
| 2009/0077390 A1 | 3/2009 | Cobelo et al. | |

FOREIGN PATENT DOCUMENTS

| | | |
|---|---|---|
| EP | 1 637 958 | 3/2006 |
| EP | 1 637 961 | 4/2006 |
| EP | 1 670 188 A2 | 6/2006 |
| WO | 9220022 | 11/1992 |
| WO | 9301550 | 1/1993 |
| WO | 9535533 | 12/1995 |
| WO | 98/42098 | 9/1998 |
| WO | 0067095 | 11/2000 |
| WO | 2005/104686 A2 | 11/2005 |
| WO | 2007/060516 A2 | 5/2007 |
| WO | 2008/013504 | 1/2008 |
| WO | 2008/034900 | 3/2008 |
| WO | 2008157639 | 12/2008 |

OTHER PUBLICATIONS

"How to Install Software—A 12 Step Program", Network Administractor.com, all pages, Dec. 31, 2006. http://web.archive.org/web/20061231162701/http://www.thenetworkadministrator.com/how_to_install_software.htm.*

European Patent Office, International Searching Authority, PCT Notification of Transmittal of the International Search Report and the Written Opinion for International Application No. PCT/US2008/077245, Dec. 10, 2008, 13 pages.

"Technical Details on Microsoft Product Activation for Windows XP," Internet Citation, XP002398930, Aug. 13, 2001.

Williams et al., "Web Database Applications with PHP & MySQL," O'Reilly Media Chapter 1, Database Applications and the Web Mar. 2002, Internet Article retrieved on Sep. 21, 2010. XP002603488.

Williams, R., "A Painless Guide to CRC Error Detection Algorithms," Aug. 13, 1993, 33 pages, www.ross.net/crc/download/crc_v3.txt.

Angha et al.; Securing Transportation Network Infrastructure with Patented Technology of Device Locking—Developed by Uniloc USA; http://www.dksassociates.com/admin/paperfile/ITS%20World%20Paper%20Submission_Uniloc%20_2_.pdf; Oct. 24, 2006.

Econolite; Econolite and Uniloc Partner to Bring Unmatched Infrastructure Security to Advanced Traffic Control Networks with Launch of StrongPoint; http://www.econolite.com/docs/press/20080304_Econolite_StrongPoint.pdf; Mar. 4, 2008.

Williams, "A Painless Guide to CRC Error Detection Algorithms," 33 pages, www.ross.net/crc/download/crc_v3.txt, Apr. 12, 2010.

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

* cited by examiner

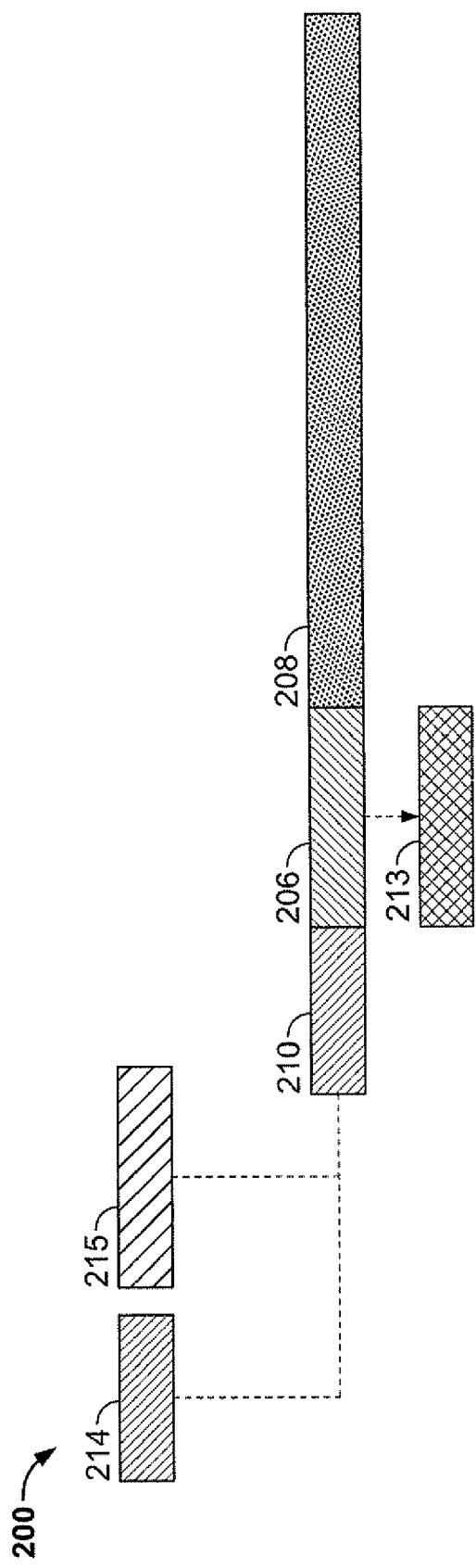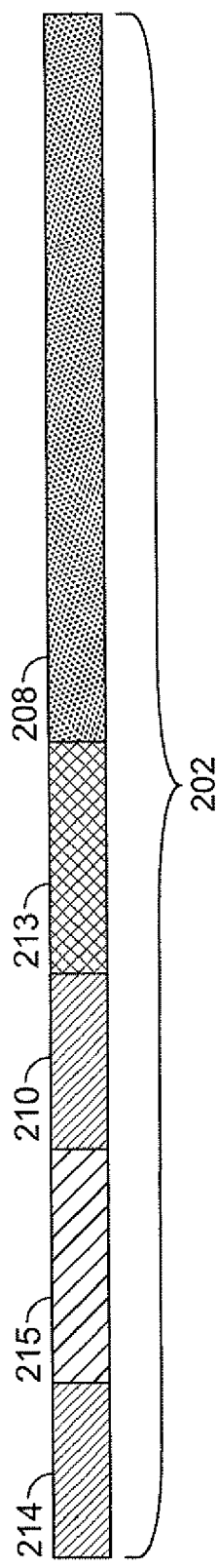

INSTALLING PROTECTED SOFTWARE PRODUCT USING UNPROTECTED INSTALLATION IMAGE

CROSS-REFERENCE TO RELATED APPLICATION

This application claims priority pursuant to 35 U.S.C. §119(e) to U.S. provisional application Ser. No. 60/973,781, filed Sep. 20, 2007, which application is specifically incorporated herein, in its entirety, by reference.

BACKGROUND

1. Field

The present disclosure relates to methods and systems for protecting software from unauthorized copying and reverse-engineering.

2. Description of Related Art

Many different methods of installing software and protecting installed software exist in the art. As used herein, software protection includes adding copy control and anti reverse engineering functionality to an existing application, either before or after it is compiled. Such software protection operates to prevent unauthorized copying or reverse engineering of the software that is being protected. As such, software protection does not provide core functionality to the end user or drive distribution of software products, and may require programming expertise different from what is needed for the core software to develop. Therefore, protection may often be added to a software product after the product's core functionality has been designed, implemented, and tested. It is often desired to add software protection after a software product has completed testing and has been implemented as an application installation image configured for installation on client computers. The original installation image, which does not include the desired software protection features, must therefore be altered to include them.

As used herein, an "installation image" refers to all executable and non-executable data making up a software product application and all of its supporting data or applications, configured for encoding on a computer-readable medium or for transmission to a client for storage on or in a computer-readable medium. As used herein, "executable data," "executable code," "software executable," or generally, "executable" means that the executable data, code or software is capable of being executed by a computer processor after being installed in the computer system. Prior to being installed, the data, code or software may, or may not, be in executable form. Executable software that becomes executable after being installed may nonetheless not be executable until installation is completed. For example, the software executable may need to be first decrypted, assembled or decoded during an installation process. The installation image makes up the encoded data package that computer users obtain, for example, when they purchase a software product encoded on an optical disc, or download a software application. In each case the installation image includes all of the encoded information required to install the software product on a client computer.

To provide software protection for an existing software product having a completed installation image, developers of software protection often rebuild the installation image of an application to include protected versions of the main software components that make up the software product to be protected. This process requires a complete rebuild of the target product installation image, and the additional testing, quality assurance and time that this entails. Thus, software protection costs may be exacerbated by the practice of adding software protection after the application has been compiled, tested and placed into production. In addition, in such cases the original software developers, testers and quality assurance personnel may have become unavailable, causing delay in adding the software protection capabilities to the target product. For example, addition or software protection may be delayed until the release of the next version of the product, resulting in considerable exposure of the unprotected version of the software to the risk of copyright piracy or unauthorized reverse engineering.

It is desirable, therefore, to provide a method or system for adding software protection to an existing application installation image, that overcomes the limitations of the prior art as exemplified above.

SUMMARY

The present technology enables addition of a protected edition of target software after the tested installation image of the unprotected software has been installed on a computer client, without requiring rebuilding of the installation image for the protected product.

An installation image for a software product comprises executable files and non-executable data used by the one or more executable files during operation. One of the executable files operates as an installer application for installing the remainder of the executable files and data contained in the installation image. In the alternative, or in addition, one or more applications that are not included in the installation image may participate in some part of the installation process. For example, the computer system may include a generic installer application that operates to install some or all files and data included in the installation image. Installation may include decompressing compressed data or executable files, copying decompressed data or executable files to a computer memory for storage (such as to a hard drive, for example), writing information to specific system locations, such as uninstall files or shortcuts, updating system registry files, and other operations required to install the application within the client computer system as known in the art. It may be desired to provide software protection to one or more of the executable files included within the installation image. These executable files are sometimes referred to herein as "target files" or in the singular as a "target file."

Software protection techniques as known in the art may be applied to the target files to produce a corresponding number of protected executable files. The protected executable files should operate in the same way as the target files with respect to use of input data, user interface, and interacting with other executable files within the installation image. However, the protected executable files may include ancillary features that prevent unauthorized copying or reverse engineering, without interfering with functionality of the target files. These ancillary features are not present in the original target files.

To provide a protected installation image, the present technology embeds or adds an existing installation image, including the target files, inside a master installation image that also includes the protected executable files. The master installation image contains master executable code for controlling and managing the installation process as well as a protected version of at least one target software executable. These two components work with the components of the original installation image to facilitate the installation of a protected version of the target software product.

Before the addition of the original installation image to the master installation image, one or more unprotected target software executables (normally all of the target software executables for which a protected executable file has been developed) are damaged so as to become inoperable. For example, some non-zero number of bits in the files may be flipped, set to zero, or set to one, such that the binary code will not operate and cannot be reverse engineered. This may be done to ensure that an unprotected version of the target software executable (or target software executables) is never installed in the event that the installation process of the master installation image is intentionally or unintentionally interrupted. Conversely, failing to damage the target files in the master installation image may create a risk of unauthorized access to a fully working unprotected version of the product, such as may occur if the master installation process is interrupted.

The master installation image may be configured with an installation executable that operates as follows. As used herein, "installation executable" refers to an executable application, software, or code configured to perform an installation process for other software and/or data. During installation of the master installation image for the protected version of the software product, the master installation image may invoke the embedded original installation executable, which, in turn, installs a complete copy of the damaged target software executable or executables. In the alternative, or in addition, the master installation executable may invoke an installation executable not included in the installation image, for example an installation utility application include in the computer's operating system, to install the complete copy of the damaged target software executable. Therefore, a damaged version of the original target software executable is first installed. After the original installation executable has completed execution, the master installation executable code replaces the damaged version of the original target software executable with the protected version of the target software executable, thereby completing the installation of a protected version of the software product, installed on the client computer and ready for use by the end user of the software.

A more complete understanding of the system and method for installing a protected software product will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

FIG. 2A is a block diagram showing exemplary elements of an installation image and related elements prior to being embedded inside a master installation image.

FIG. 2B is a block diagram showing exemplary elements of a master installation image with the embedded original installation image shown in FIG. 1A.

DETAILED DESCRIPTION

The novel technical solution disclosed herein overcomes the limitation of the prior art to regarding installation of newly protected software products. In the detailed description that follows, like element numerals are used to indicate like elements appearing in one or more of the figures.

Figure 1:
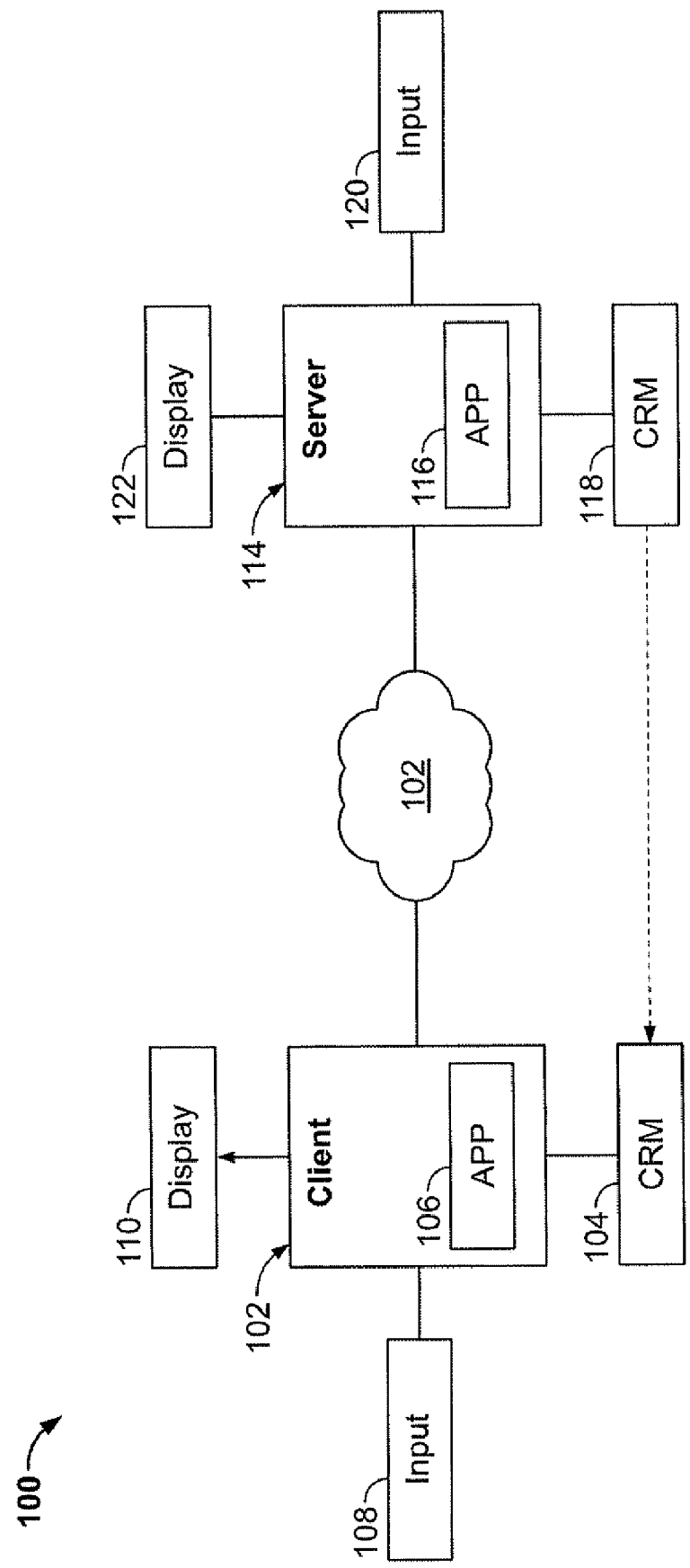
FIG. 1 shows an exemplary computer system in which various aspects of the present technology may be implemented.

FIG. 1 shows an exemplary client-server system 100 in which various aspects of the present technology may be implemented. A client computer 102 may include processor, memory, I/O, and other components as known in the art, and one or more devices for reading and/or writing to a computer-readable medium 104. For example, the client 102 may comprise an internal magnetic media hard drive, a DVD or CD-ROM optical drive, and a USB port for connecting to a flash memory drive. The client may also include processor memory 106 used for operating one or more software applications as described herein. In general, software applications are designed to receive some form of input from an external device or process, and process the input to provide some tangible output to an output device or to another process. For example, an application may be designed to receive keyboard input from a keyboard 108, process the input, and provide output to a display device 110, such as a computer monitor. Optionally, the client 102 may be adapted to connect to a wide area network 112 or other computer network for communicating with one or more other computers, for example a server 114. Server 114 may comprise a computer with components as known in the art, including, for example, a device for reading and/or writing to a computer-readable medium 118, processor memory 116 for operating one or more applications, at least one input device 120 and a display device 122. In application of the present technology, a server such as server 114 may be used to prepare a master installation image, which may be transmitted to one or more clients such as client 102 via a wide area network or other communications network, or physically transported to the client on a tangible computer-readable medium.

Figure 3:
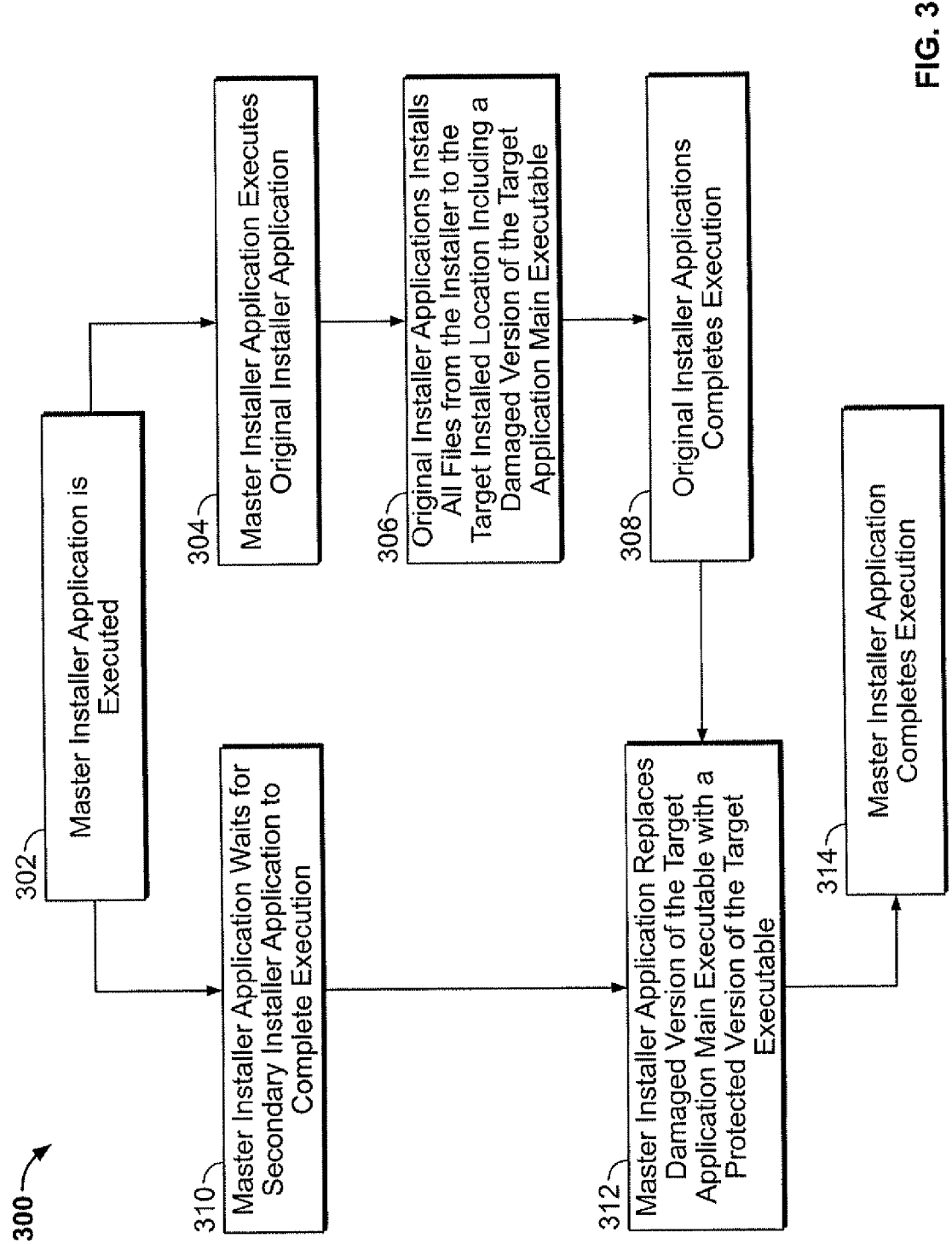
FIG. 3 is a flow chart showing an exemplary process flow implemented by operation of a master installation image on a client computer.

An exemplary configuration and operation of a master installation image is shown in FIGS. 2A, 2B and 3. FIGS. 2A-2B show exemplary components of a protected software installation image. An original compiled installer component may be produced in the form of an installation image file 200, sometimes referred to herein as an original installation image, that contains at least one target software executable 206 and a combination of additional files and data 208. The target software executable 206 may be in the form of a binary-coded file or file portion configured to be loaded into a processor memory and thereby cause a client computer to carry out the processes for any desired application, as known in the art. Data, in contrast, is not executable and may be used as input for an application-driven computer process, and/or may represent output from the computer process. Some additional executable code 210 may be placed in the installation image so as to load prior to loading the target software executable 206 to control and manage an installation process. In the alternative, or in addition, the installation image may be configured for installation by a pre-existing installer application on the target computer, which may obviate the need for an installation executable in the installation image itself. An installation process may include, for example, decompressing compressed data or executable files from the installation image 200, copying decompressed data or executable files to a computer memory for storage, writing information to specific system locations, such as uninstall files or shortcuts, updating system registry files, and other operations required to install the application within the client computer system, as known in the art. The installation executable 210 and target software executable may comprise two or more separate files, or in the alternative, may be integrated into a single file or portion of the installation image 200. After installation, the target software executable 206 may comprise one or more separate files within a file system of the target computer.

The target software executable 206 included in the original installation image may lack certain desired software protection features, and therefore it is desired to update it with a more thoroughly protected version. The original executable 206 may have some protection features; it need not be entirely devoid of such features.

To update the installation image 200 with improved protection features present in a protected version 215 of the target software executable, a new master installation executable 202 may be created. The protected software executable 215 should not include any changes that will affect operation of the executable in relation to the data 208 or installation configuration implemented by the installer 210, or in the alternative, by an external installation utility, if used. If such changes are necessary, the technical solution described herein may have unpredictable results, and is not recommended. The present solution addresses circumstances wherein the addition of desired protection features does not change operational features of the target software executable with respect to the original installation image configuration.

The new master installation image 202 may be assembled by embedding or integrating the original compiled installation image 200 that includes all the components of the compiled installer in their compiled state for installation in addition to a protected version of the target software executable 215, which may operate in the same way as the target software executable 206 with the addition of protection capabilities. The master installation file 202 may also comprise additional master installation executable code 214 configured to load and execute with the highest priority within the master installation image 202, to initiate, control and manage the installation process as explained in more detail below in connection with FIG. 3. Initially, the master installation executable code 214 may be configured to trigger the original compiled executable file 200 which, in turn, controls and manages its own installation process.

Before the original compiled installation image 200 is integrated with the master installation image 202, the target software executable 206 contained in the installation executable 200 may be damaged to transform it into a damaged executable file 213. This may be done to ensure that after installation, the target software executable in its damaged state 213 will not run and cannot be decompiled, in case the installation process carried out by the master installation image 202 is somehow interrupted. Damage may be done in a random, irreversible manner so that the original file cannot be restored by someone who possesses or guesses the algorithm used to damage the target software executable. For example, a damage algorithm may randomly select and flip the value of bits within the target software executable, thereby corrupting it, rendering it inoperable and impossible to decompile. As such, damaging the file, which irreversibly corrupts the executable file, is distinct from encryption, which places the file in a temporarily inoperable state that may be reversed by anyone possessing a decryption key. Of course, instead of damaging the target software executable 206 to produce a damaged executable 213, the target software executable may be left undamaged or merely encrypted. These alternatives, however, may entail increased risk of unauthorized use. The master installation image may be used to delete or overwrite the damaged executable 213, so there should be no reason to preserve its operability.

After being assembled, the master installation image 202 may comprise one or more files made up of component parts, as follows. The installation image 202 may comprise a master installation executable file or file portion 214, which is configured to initiate and control the master installation process. The installation image 202 may further comprise the protected version 215 of the target software executable, the original installation executable 210, the damaged original (unprotected) target software executable 213, and the original data 208.

FIG. 3 shows exemplary steps of an installation method 300 such as may be implemented by a master installation image operating on a client computer. Method 300 may be initiated by running the master installation image, which may be configured to operate first when after the master installation image is copied to the client computer and selected for installation by a computer user, or automatically run. Upon initializing, the master installer application may execute the original installer executable at 304 or external installation application if applicable, and also initiate a wait process 310 that waits for the original installer application to complete execution. At 306, the original installer application may install all files from the original installation image, which may include a damaged version of the target application main executable, or in the alternative, an undamaged or encrypted version. When the original installer application completes execution at 308, the master installer monitoring process 310 may trigger a replacement process 312, that replaces the damaged version of the target software executable (or in the alternative, the undamaged or encrypted original target software executable) with the protected version of the original target software executable. For example, the replacement process may overwrite the damaged target software executable with the protected version of the target software executable having an identical file name in the client file system, or may delete the original target software executable from the file system and then write the protected version of the target software executable, having a filename identical to the deleted file, to the client file system. The target software executable may comprise more than one file, in which case each file may be replaced by a protected version of the file under the same file name. Subsequently the master installer application completes execution 314 and terminates. The result of method 300 should be that the protected application version is installed on the client system with all necessary data, registry entries, DLL files, and other system files necessary to facilitate proper operation of the application on the client, and the original target software executable no longer exists in the client computer system as an operable file. It may still exist on the client as part of the master installation image, if the master installation image is not deleted. However, if damaged as disclosed herein, it cannot be extracted for unauthorized use.

Figure 4:
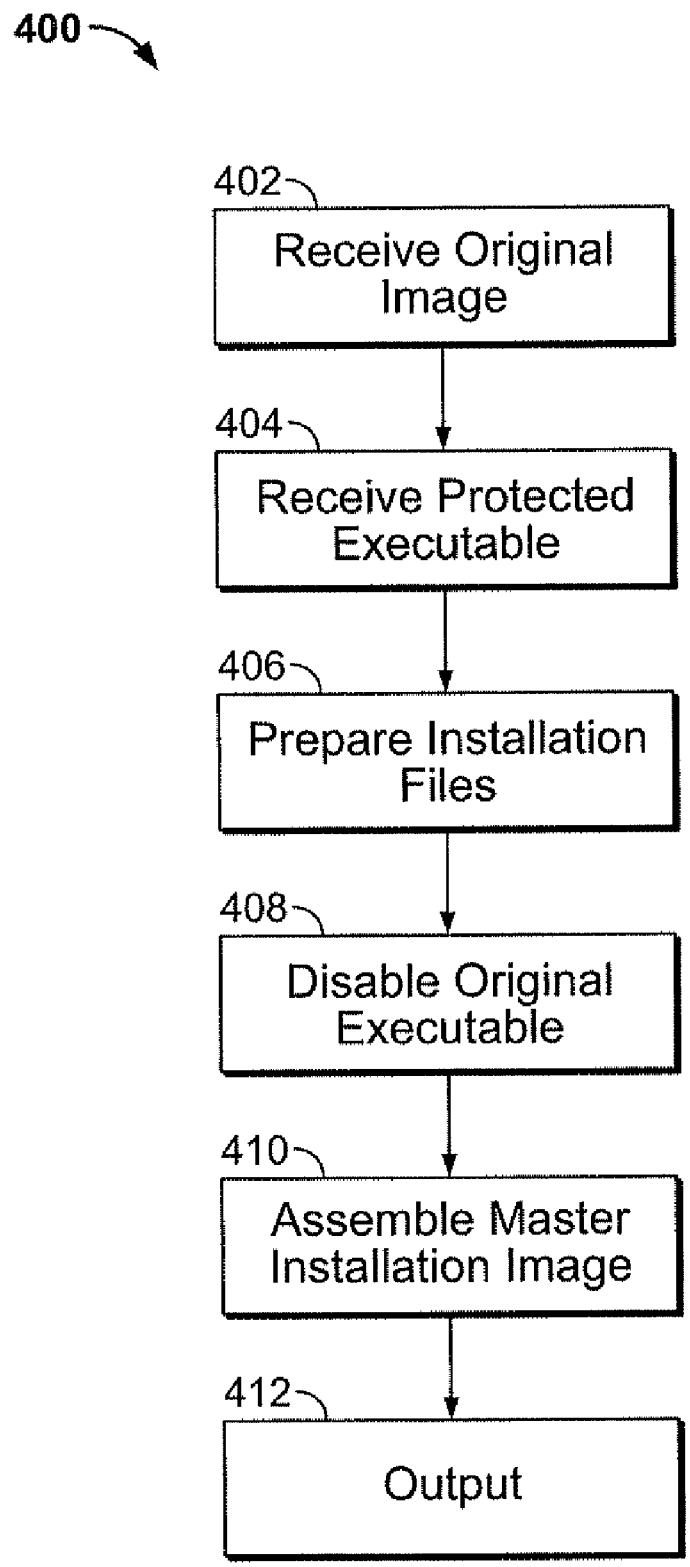
FIG. 4 is a flow chart showing an exemplary method for preparing a master installation image.

FIG. 4 shows exemplary steps 400 for preparing a master installation image, in accordance with the foregoing. The master installation image may be prepared, for example, using a server for distribution to multiple target clients. At 402, the server may receive a copy of the original installation image. This may be the original image as prepared for distribution by the original software developers. A protected version of the target software executable may be received by the server at 404. This should possess the attributes described above, and may be prepared as known in the art of software protection. Methods for coding software protection features are not the concern of the present disclosure, and are known in the art. At 406, a master installation executable for the master installation image may be prepared and received for use by the server. The master installation executable should be programmed to incorporate the essential features diagrammed in FIG. 3 and otherwise disclosed herein. At 408, the original target software executable included in the original installation image may be disabled, that is, damaged as described above. For example, randomly selected bits in the executable may be flipped. An algorithm may be employed to randomly select and flip the bits in a pattern sufficiently complex and massive so as to make repair of the target software executable virtually impossible. For example, if the target software executable comprises $10^8$ bits of data, the algorithm may flip 10 bits at each of, for example, 1000 randomly selected locations. At 410, the server may be used to assemble the master installation image as diagrammed in FIG. 2B. The finished master installation image may be output 412, for example, by transmitting to a target client or by encoding on a computer-readable medium. In general, the server may transmit multiple copies of the master installation image to a corresponding number of target clients via a network connection. In the alternative, or in addition, duplicate copies of the master installation image may be encoded on optical discs or in flash memory devices for physical distribution to target clients.

Having thus described exemplary embodiments for installing a protected software product using an unprotected installation image, it should be apparent to those skilled in the art that certain advantages of the within system have been achieved. It should also be appreciated that various modifications, adaptations, and alternative embodiments thereof may be made without departing from the scope and spirit of the present technology. For example, methods and systems for installing a single target software executable have been illustrated, but it should be apparent that the novel concepts described above may be applied by one of ordinary skill to multiple executables within an installation image to thereby realize the benefits described herein. The following claims define the scope of what is claimed.

What is claimed is:

1. A method for installing a protected software product using an unprotected installation image, comprising:
   loading a master installation image encoded on and loaded locally from a computer-readable medium to initiate an installation process on a client computer system to effect installation of the protected software product, the master installation image including (i) a master installation executable, (ii) the unprotected installation image comprising a damaged unprotected version of a software executable that is deliberately and irreversibly corrupted so that it will not run and cannot be decompiled, and (iii) a protected version of the software executable;
   in response to initiating the installation process, installing the damaged unprotected software executable into the client computer system;
   deleting the damaged unprotected software executable from the client computer system after installing the unprotected software and before terminating the installation process; and
   writing the protected version of the software executable to a memory of the client computer in place of the unprotected software executable that is deleted from the client computer system, to complete installation of the protected software product.

2. The method of claim 1, wherein installing the unprotected software executable file includes installing only a damaged version of the unprotected software executable.

3. The method of claim 1, wherein installing the unprotected software executable file is performed using an installation executable included in the unprotected installation image.

4. The method of claim 1, wherein writing the protected software executable to the memory comprises saving the protected software executable as an executable file in a file system of the client computer.

5. The method of claim 4, wherein saving the protected software executable as an executable file comprises assigning a file name to the executable file that is identical to a prior file name previously used to save the unprotected software executable in the file system.

6. The method of claim 5, wherein writing the protected software executable as an executable file overwrites the unprotected software executable.

7. The method of claim 1, wherein initiating the installation process is performed by the master installation image.

8. The method of claim 1, further comprising reading the installation image from a computer-readable medium.

9. The method of claim 1, further comprising receiving the installation image at the client computer from a remote server.

10. A non-transitory computer-readable medium encoded with instructions comprising:
    initiating an installation process on a client system for installation of a protected software executable;
    in response to initiating the installation process, installing a damaged unprotected software executable included in a first installation image into the client computer system, the damaged unprotected software executable deliberately and irreversibly corrupted so that it will not run and cannot be decompiled;
    deleting the unprotected software executable from the client system after installing the unprotected software arid before terminating the installation process; and
    writing the protected software executable to a memory of the client computer in place of the unprotected software executable that is deleted from the client computer system, to complete installation of the protected software product.

11. The computer-readable medium of claim 10, further encoded with instructions for installing only a damaged version of the unprotected software executable.

12. The computer-readable medium of claim 10, further encoded with instructions for installing the unprotected software executable using an installation executable included in the unprotected installation image.

13. The computer-readable medium of claim 10, further encoded with instructions for saving the protected software executable as an executable file in a file system of the client system.

14. The computer-readable medium of claim 13, further encoded with instructions for assigning, a file name to the protected software executable that is identical to a prior file name previously used to save the unprotected software executable in the file system.

15. The computer-readable medium of claim 13, further encoded with instructions for writing the protected software executable as an executable file, thereby overwriting the unprotected software executable.

16. The computer-readable medium of claim 13, further encoded with instructions for initiating the installation process using a second installation image comprising the first installation image, the protected software executable, a first executable for initiating the installation process, and second executable for writing the protected software executable to the client memory.

\* \* \* \* \*